United States Patent [19]

Pack

[11] Patent Number: 5,209,763
[45] Date of Patent: May 11, 1993

[54] METHOD OF BOOSTING THE EFFICIENCY OF REMOVING NONCONDENSABLE GASES FROM VAPORS

[75] Inventor: Garrett E. Pack, Laguna Beach, Calif.

[73] Assignee: Electric Power Research Institute, Inc., Palo Alto, Calif.

[21] Appl. No.: 267,417

[22] Filed: Nov. 4, 1988

[51] Int. Cl.$^5$ .............................................. B01D 19/00
[52] U.S. Cl. ............................................. 55/39; 55/42
[58] Field of Search ................................. 55/32, 39, 42

[56] References Cited

U.S. PATENT DOCUMENTS

| | | | |
|---|---|---|---|
| 3,837,143 | 9/1974 | Sutherland et al. | 55/32 |
| 4,330,307 | 5/1982 | Coury | 55/73 X |
| 4,498,911 | 2/1985 | Deal et al. | 55/32 |
| 4,534,174 | 8/1985 | Auerbach et al. | 60/641.5 |

OTHER PUBLICATIONS

Spencer, *EPRI Journal*, 8(8), Oct. 1983, pp. 35–37.
Hughes, *EPRI Journal*, 12(7) Oct./Nov. 1987, pp. 38–42.

*Primary Examiner*—Charles Hart
*Attorney, Agent, or Firm*—Heller, Ehrman, White & McAuliffe

[57] ABSTRACT

A method is provided for high-efficiency removal of noncondensable gases (NCG) from geothermal steam. The present method is directed to an improvement for the treatment of geothermal steam to remove most of the residual NCG that would otherwise still be present in clean steam treated by NCG-removal methods of the prior art. In addition to the geothermal application and a preferred configuration, other applications and configurations are described and claimed.

31 Claims, 1 Drawing Sheet

METHOD OF BOOSTING THE EFFICIENCY OF REMOVING NONCONDENSABLE GASES FROM VAPORS

The present invention is directed to a method for enhancing the efficiency of removing noncondensable gases from geothermal steam. It can also be applied to removal of noncondensable gases from other vapors. It boosts the efficiency of inventions that allow noncondensable gases to be removed upstream of the point where final extraction of heat or work causes the vapor to condense. The method of the present invention consists of a stripping process applied to an intermediate condensate stream.

BACKGROUND OF THE INVENTION

Fluids and steam vapor withdrawn from geothermal sources contain dissolved noncondensable gases such as carbon dioxide, hydrogen sulfide and ammonia, which flow with the steam when geothermal liquid and vapor sources are separated. The presence of these gases reduces the net power output of a power plant using steam containing noncondensable gases when compared to a power plant using steam that does not contain noncondensable gases. In addition, some of the gases, such as carbon dioxide and hydrogen sulfide, are corrosive. Furthermore, once the steam has been utilized, i.e., to drive the turbine, the discharge of the vapor or condensate containing $H_2S$ causes an environmental problem.

To deal with this problem one method is to condense the steam and reboil the condensate in a tube and shell heat exchanging system upstream of the turbine, i.e., prior to introducing the geothermal source steam to the turbine. See U.S. Pat. No. 4,330,307, incorporated herein by reference. A drop in steam temperature, which can be made small, between the two sides of the heat exchanger drives the heat transfer, and about 90 to 95% of the noncondensable gases and a small fraction of steam (about 5%) may be vented and treated separately to remove and dispose of $H_2S$ gas. The $CO_2$ can be vented into the atmosphere. By this process approximately 90% of the hydrogen sulfide and other noncondensable gases can be removed, while keeping the steam close to the temperatures and pressures produced at the wellhead in the geothermal field and without requiring any chemical treatment of the main flow stream through the power plant.

Another method is to send the geothermal steam to a direct contact reboiler in which the geothermal steam is used to heat a relatively cool condensate flowing through the reboiler, whereby the noncondensable gases are cooled and separated from the steam. See U.S. Pat. No. 4,534,174, incorporated herein by reference.

A problem, however, still exists in that small amounts of hydrogen sulfide, carbon dioxide, ammonia and perhaps other noncondensables are still present in the so called "clean steam" resulting from processes such as those described in U.S. Pat. No. 4,330,307 and 4,534,174 because the condensate at the bottom of the condensing side of such an upstream reboiler is in a chemical equilibrium in relationship with the feed steam that contains the noncondensables. Due to existing and possibly future stringent, emission standards, even the small amounts of $H_2S$ present in steam must be controlled in some situations, either for attaining emission standards or for reducing acid gases in turbines and condensers. Removal of this small amount of $H_2S$ also may be beneficial in reducing chemical and maintenance requirements for $H_2S$ abatement and simplifying the condenser design. In some situations removal of even small amounts of residual $CO_2$ may be desirable.

It is therefore an object of the present invention to provide a method for enhancing the removal of noncondensable gases from geothermal steam from which the majority of the noncondensable gases has already been removed by an upstream method, such as, those methods described in U.S. Pat. Nos. 4,330,307 and 4,534,174. This and other objects of the invention will be apparent from the following description, the appended drawing and from practice of the invention.

SUMMARY OF THE INVENTION

A method is provided for enhancing the removal of noncondensable gases from geothermal steam, comprising the steps of conducting the geothermal steam into a shell-and-tube reboiler or direct contact reboiler to separate the majority of the noncondensable gases from the steam; then stripping the residual non-condensable gases from the condensate of the reboiler in a stripper.

BRIEF DESCRIPTION OF THE DRAWING

The attached figure shows an apparatus for performing the method according to the present invention.

DESCRIPTION OF THE PREFERRED EMBODIMENT

Figure 1:
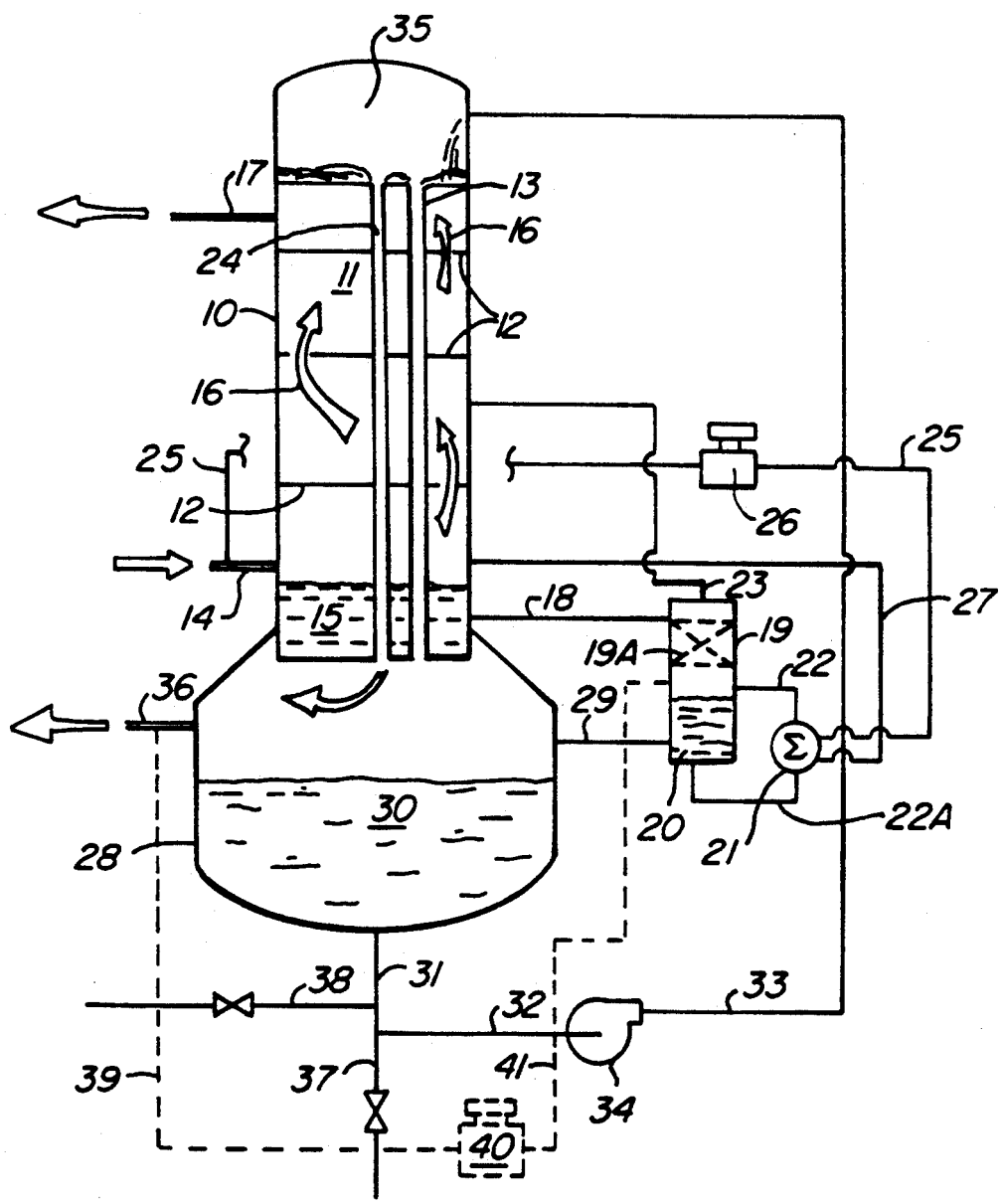

A preferred material applicable for treatment according to the present invention is condensate derived from geothermal steam. It is first treated by a condensing-reboiling process to remove a majority of the noncondensable gases. The preferred condensing-reboiling treatment will be described in connection with the apparatus shown in the Figure, but it will be realized that other such similar and equivalent apparatus may be utilized in accordance with the principles and description provided hereinbelow.

Referring to the FIGURE, there is shown a reboiler comprising a shell 10 defining an interior condensing zone 11. The zone 11 is provided with a series of baffles 12 for enhancing the efficiency of the fractionation of the steam from the noncondensable gases. Through the condensing zone 11 there is a plurality of vertically oriented tubes 13, the exteriors of which are exposed to zone 11 and the interiors of which form the reboiling zone of the reboiler. The geothermal steam is introduced into the condensing zone 11 through shell 10 via inlet 14. The steam condenses on the exterior of tubes 13 and partially along the walls of the shell 10, and condensate 15 collects on the baffles 12 and at the bottom of the condensing zone 11. The noncondensable gases depicted by arrows 16 rise through the baffles and are withdrawn through outlet 17. The condensate 15 is then conducted through line 18 into stripper 19. As shown the stripper 19 is disposed below the level of the condensate 15 within the condensing zone 11, therefore the condensate 15 may flow into the stripper 19 by gravity. Alternatively, the stripper 19 may be located elsewhere and the condensate 15 may be conducted into the stripper 19 by way of a pump (not shown), if required. The stripper 19 contains packing or trays 19A. A portion of the feed steam is directed via line 25, and compressor 26, into small reboiler 21, where it is at a pressure higher than the pressure in zone 11. This compressed steam is used to heat a portion of condensate 20 which is withdrawn from the bottom of stripper 19, heated and partially vaporized in small reboiler 21 and reintroduced into the stripper 19 via line 22. As steam formed from condensate vaporized in the small reboiler 21 rises countercurrently through packing (or trays) 19A, residual noncondensable gases are separated and withdrawn through line 23 and condensate returns to the condensate reservoir 20. The gases and the steam carrying the gases are reinjected into zone 11 via line 23. These gases and the steam not condensed in zone 11 are combined with the other gases and uncondensed steam and are withdrawn via line 17. Condensate, steam and gases from the heat input side of small reboiler 21 are discharged to zone 11 via line 27.

As an alternative to heating stripper 19 with small reboiler 21, clean steam from line 39 may be compressed in compressor 40 and injected directly into stripper 19 via line 41. It will be realized that any other alternative method of heating stripper 19 may be used, and that the methods of applying heat to stripper 19 are not limited to those specifically described herein.

The condensate 20 will be then deposited into sump 28 via line 29 in which is collected a reservoir of clean condensate. This condensate is recycled via lines 31, 32 and 33 via pump 34 to a flood space 35 disposed atop the vapor zone 11 and in communication with the interior of tubes 13. The condensate will then flow as a thin film along the interior surfaces of tubes 13 downwardly in heat exchanging contact with the incoming steam within zone 11 and will then be revaporized into steam, exiting the bottom of tubes 13 and withdrawn through line 36 for further use. The nonrevaporized liquid passing through tubes 13 is returned to the reservoir 30 and then recycled to the flood box 35. Alternative uses of the reservoir 30 are directly to blowdown through line 37. Make-up water can be added to line 32 via line 38. In yet another alternative configuration (not shown) the sump 28 containing the condensate reservoir 30 may be a separate vessel exterior to shell 10.

A primary advantage of the present invention is that there is a high removal efficiency of $H_2S$ from the geothermal steam (greater than 90%) at low vent rates (i.e., low losses of steam through vent 17, shown in the FIGURE). It is desirable to keep the vent rate as low as possible since high vent rates result in the loss of usable steam, and therefore loss of usable power. The vent rate is defined as the fraction of incoming steam from line 12 which is not condensed in zone 11, and is therefore lost from usable steam (line 36) being discharged instead through vent 17 to carry out the noncondensable gases.

It will also be realized that various modifications may be made to the above-described preferred embodiments. Such modifications include the use of a direct contact reboiler process such as that disclosed in U.S. Pat. No. 4,534,174, rather than a shell-and-tube configuration described in the FIGURE. The stripper 19 (referring to the FIGURE) may be therefore used to remove the remaining condensable gases from such a direct contact reboiler.

It will also be realized that the tubes 1 need not be vertically disposed. For example, they may be horizontally disposed within the shell space.

Furthermore, the functions of the shell space 11 and the interior of tubes 13 may be reversed, i.e., the shell space 11 may be utilized as the reboiler and the interior of tubes 13 may be utilized as the condensing zones.

Furthermore, the invention has applicability to steam from any source which contains noncondensable gases, not only geothermal steam. The apparatus described herein may be utilized, for example, for steam which contains gases which have substantially the same solubility in steam and condensate as that of $H_2S$ or $CO_2$ in geothermal steam and geothermal steam condensate. Furthermore, the noncondensable gases which may be removed from steam, including geothermal steam, include not only $H_2S$ and $CO_2$, but also hydrogen, methane, hydrocarbons, nitrogen, helium and other noble gases.

The invention is applicable not only to steam, but also to any vapor which contains noncondensable gases which have solubilities in said vapor and its condensate similar to the solubilities of $H_2S$ and $CO_2$ in geothermal steam and its water condensate.

As an example of operational conditions, for nominal 1000-lb/h inlet steam flow in a heat exchanger having the configuration shown in the FIGURE without use of stripper 19, about 95% of the noncondensable gases and about 3-7% of uncondensed steam flow out of the vent 17, when the inlet stream 12 contains from 0.3 to 1.3% by weight $CO_2$. A temperature difference, $\Delta t$, between the shell side (the vapor zone 11) and the interior of the tubes 13 enables heat to flow from condensing inlet steam to the evaporating clean steam. Saturated temperature and pressure conditions prevail on each side of the walls of the tubes 13 because of equilibrium between the vapor and liquid water. As exemplary conditions, $\Delta t$ may be kept at about 8° F. The optimum $\Delta t$ may range from as low as 4° F. to as high as 80° F., or more, depending on steam pressure and noncondensable gas concentration in the inlet steam. Such operating parameters as vent rate (through vent 17), circulation rate (via line 33, etc.), blowdown rate (via line 37) and pressure drop between the two sides ( 11 and 24) of the reboiler 10 may be varied in order to achieve optimum reboiler performance for a particular geothermal steam source and its intended turbine application. Through field testing it was determined that at 115 psia, the $H_2S$ removal efficiency was 94% at a 6% vent rate and dropped below 92% at a 2% vent rate. However, when the stripper 19 is in operation in accordance with the present invention, $H_2S$ and $CO_2$ removal efficiencies in the 97-99% range were measured at low vent rates (approximately 3%).

The primary advantages of the present invention, used in conjunction with basic reboiler technology, are as follows: (1) It can be operated in conjunction with reboiler 10 with steam at the same pressures and temperatures as produced at the wellheads in geothermal fields; (2) it does not require chemical treatment of any main flow stream either to or through the power plant; (3) it can achieve high levels (i.e., 97-99%) of $H_2S$ removal; and (4) these high levels of $H_2S$ removal may be achieved without resorting to high vent rates. As a result, it is advantageous to use the clean steam resulting from this process for operation of a turbine, taking advantage of the fact that the steam flowing into the turbine and condenser is clean and less corroding. Furthermore, the $H_2S$ removed by the upstream process according to the present invention does not enter the turbine condensate where its removal could require liquid-phase (secondary) treatment to meet hydrogen sulfide emission requirements. Furthermore, removal of virtually all noncondensable species of low solubility, not just hydrogen sulfide, minimizes the loss of power or steam associated with the ejection of gases from the condenser. Furthermore, hydrogen sulfide can be removed from the geothermal steam even during periods when the turbine and generator are inoperative, thus there is no need to close down the geothermal well or to use a separate abatement system to control emissions during those periods.

A net power analysis has been performed for a typical turbine power plant having no $H_2S$ abatement system and a system using 14% of the steam entering the plant to drive jet ejectors which remove the noncondensable gases from the condenser. To compare the existing unabated plant with a plant that uses an apparatus according to the present invention with the stripper 19 to remove $H_2S$ upstream of the plant, the following factors were considered: vent rate, pressure drop associated with $\Delta t$ across the tubes, reboiler pumping rate (the parasitic power required to run the condensate recirculation pump or pumps in the reboiler or reboiler/stripper system), gas ejector loss (steam loss resulting from the use of ejectors to remove noncondensable gases, especially in the unabated plant used for the comparison), turbine output (difference between power produced by a turbine using pure steam and one using steam containing noncondensable gases), back pressure effect (the increase in power output of a turbine exhausting to a condenser at the lower pressure possible because of the reboiler), blowdown (heat loss in the reboiler that is reflected in a blowdown rate, that is, the fraction of inlet steam ejected as water from the sump and not available to be reboiled to make clean steam for the turbine), and compressor power (the parasitic power required to drive compressor 40 in the alternative configuration shown by the dashed flow lines 39 and 41 in the FIGURE). (This compressor power is associated with the recirculation of some clean steam as stripping steam.) These factors were used in a calculation of net power output from a plant equipped in accordance with the present invention (reboiler/stripper) and from a plant equipped in accordance with the previous invention U.S. Pat. No. 4,330,307 (reboiler only). In both cases the net power was compared to that from an unabated plant.

The following Table 1 shows the comparison, first listing the performance, steam supply and operating characteristics that define the case, and then listing the factors that have an effect on the net power output. The effects are given in percentage points on the basis of the increase (+) or decrease (−) that would occur relative to an unabated plant. The column labelled "Reboiler Only" is a case in which the stripper 19 in the FIGURE is used only as a condensate collector. The case "Reboiler/Stripper" is a case in which the stripper 19 is used in accordance with the present invention.

TABLE 1

| EFFECTS ON NET POWER (Compared With Unabated Plant) | | |
| --- | --- | --- |
| Factor | Reboiler Only | Reboiler/ Stripper |
| Performance | | |
| $H_S$ removal (%) | 94 | 98 |
| Steam Supply | | |
| Line pressure (psia) | 90 | 90 |
| $CO_2$ content (ppm) | 13,000 | 13,000 |
| Operating Parameters | | |
| $\Delta$ drop in reboiler (°F.) | 8 | 8 |
| Turbine inlet pressure (psia) | 80 | 80 |
| Vent rate (%) | 6 | 3 |
| Stripper rate (%) | none | 4 |
| Net Power Effects (%) | | |

TABLE 1-continued

| EFFECTS ON NET POWER (Compared With Unabated Plant) | | |
| --- | --- | --- |
| Factor | Reboiler Only | Reboiler/ Stripper |
| Gas ejector gain | +14.0 | +14.0 |
| Vent rate | −6.0 | −3.0 |
| Pressure drop | −3.0 | −3.0 |
| Reboiler pump | −0.3 | −0.3 |
| Gas ejector loss | −1.6 | −1.6 |
| Turbine | −0.4 | −0.4 |
| Backpressure | 0.0 | 0.0 |
| Blowdown | −0.5 | −0.5 |
| Compressor | 0.0 | −0.6 |
| Total | +2.2 | +4.6 |

To calculate the recirculation pumping requirements in Table 1, the conceptual design for an 18-MW(e) upstream reboiler was utilized. It is noted that the 4% flow shown as stripping steam in Table 1 is not a loss of steam because the stripping steam is returned to the shell side of the reboiler to be condensed and added to the clean steam power. Hence, for the alternative configuration of the FIGURE which was the configuration analyzed to prepare Table 1, the power loss associated with the stripper consists primarily of the compressor used to increase the pressure of the approximately 4% of the clean steam that is recirculated to provide clean stripping steam at the shell side temperature.

Having described the preferred embodiments of the present invention, various modifications will be apparent to those of ordinary skill in the art, which modifications are intended to be within the scope of the present invention. The present invention is not to be limited except by the scope of the following claims.

I claim:

1. In a method for removing noncondensable gases from a vapor comprising the step of bringing said vapor as incoming vapor into a condensing zone of heat exchanging means into countercurrent heat exchange relationship with a liquid,
   whereby noncondensable gases are separated from said vapor as said vapor forms a condensate;
   the improvement comprising the steps of (1) continuously conducting said condensate into a stripping means whereby said condensate and residual noncondensable gases contained therein are separated through exposure of said condensate to vapor having a lower concentration of noncondensable gases than vapor in contact with said condensate when formed in said condensing zone; and
   (2) vaporizing at least a portion of the condensate from said stripping means to form vapor essentially free of noncondensable gases.

2. In a method according to claim 1 wherein said vapor is brought into heat exchange relationship with said liquid in said heat exchanging means by:
   (a) conducting said vapor into a shell-and-tube heat exchanging means comprising said condensing zone and a reboiling zone whereby said vapor forms said condensate within said condensing zone and most of said noncondensable gases remain separate from said condensate;
   (b) continuously withdrawing said noncondensable gases from said condensing zone;
   (c) continuously conducting said condensate from said condensing zone into a condensate reservoir and flowing condensate from said reservoir into said reboiling zone whereby at least a portion thereof is reconverted into vapor by contact with tube surfaces in a heat-exchanging manner;

(d) continuously withdrawing vapor free of most of said noncondensable gases from said reboiling zone.

3. A method according to claim 2 wherein said reboiling zone comprises a first zone of heat exchange followed by a second zone of evaporation.

4. A method according to claim 2 wherein said vapor comprises geothermal steam.

5. A method according to claim 4 wherein said noncondensable gases comprise hydrogen sulfide, carbon dioxide and ammonia.

6. A method according to claim 2 wherein said vapor comprises steam from a nongeothermal source and said noncondensable gases comprise gases having solubility in said vapor and its condensate comparable to the solubilities of hydrogen sulfide and carbon dioxide in geothermal steam and its condensate.

7. A method according to claim 2 wherein said noncondensable gases have solubilities in said vapor and its condensate comparable to $H_2S$ and $CO_2$ in geothermal steam.

8. A method according to claim 1 or 2 whereby the fraction of incoming vapor into said condensing zone which is not condensed in said condensing zone is reduced in comparison to a method not employing said steps (1) and (2) while achieving the same degree of separation of noncondensable gases from said vapor.

9. A method according to claim 1 or 2 wherein said stripping means comprises heating means and a vessel containing packing or trays for stripping noncondensable gases out of said condensate into a counterflowing vapor.

10. A method according to claim 9 wherein said heating means comprises a second heat exchanging means heated by compression of a portion of incoming vapor.

11. A method according to claim 9 wherein said heating means comprises compressed vapor from said step (d) directed into said stripper.

12. A method according to claim 2 wherein said tubes are vertically disposed in said condensing zone.

13. A method according to claim 2 wherein said tubes are horizontally disposed in said condensing zone.

14. A method according to claim 2 wherein said shell comprises said condensing zone and the interior of said tubes comprises said reboiling zone.

15. A method according to claim 2 wherein said shell comprises said reboiling zone and the interior of said tubes comprises said condensing zone.

16. A method according to claim 15 wherein said shell comprises said condensing zone and the interior of said tubes comprises said reboiling zone.

17. A method according to claim 16 wherein said stripping means comprises heating means and a vessel containing packing or trays for stripping noncondensable gases out of said condensate into a counterflowing vapor.

18. A method according to claim 17 wherein said heating means comprises a second heat exchanging means heated by compression of a portion of incoming vapor.

19. A method according to claim 17 wherein said heating means comprises compressed vapor from said step (d) directed into said stripper.

20. A method according to claim 17 wherein said vapor comprises geothermal steam.

21. A method according to claim 20 wherein said noncondensable gases comprise hydrogen sulfide, carbon dioxide and ammonia.

22. A method according to claim 17 wherein said vapor comprises steam from a nongeothermal source and said noncondensable gases comprise gases having solubility in said vapor and its condensate comparable to the solubilities of hydrogen sulfide and carbon dioxide in geothermal steam and its condensate.

23. A method according to claim 17 wherein said noncondensable gases have solubilities in said vapor and its condensate comparable to $H_2S$ and $CO_2$ in geothermal steam.

24. A method according to claim 1 wherein said liquid comprises condensate and said vapor and said condensate are brought into direct contact in said condensing zone.

25. A method according to claim 24 wherein said vapor comprises geothermal steam.

26. A method according to claim 25 wherein said noncondensable gases comprise hydrogen sulfide, carbon dioxide and ammonia.

27. A method according to claim 24 wherein said vapor comprises steam from a nongeothermal source and said noncondensable gases comprise gases having solubility in said vapor and its condensate comparable to the solubilities of hydrogen sulfide and carbon dioxide in geothermal steam and its condensate.

28. A method according to claim 24 wherein said noncondensable gases have solubilities in said vapor and its condensate comparable to $H_2S$ and $CO_2$ in geothermal steam.

29. A method according to claim 24 wherein said stripping means comprises heating means and a vessel containing packing or trays for stripping noncondensable gases out of said condensate into a counterflowing vapor.

30. A method according to claim 29 wherein said heating means comprises a second heat exchanging means heated by compression of a portion of incoming vapor.

31. A method according to claim 29 wherein said heating means comprises compressed vapor from said step (d) directed into said stripper.

* * * * *

UNITED STATES PATENT AND TRADEMARK OFFICE
CERTIFICATE OF CORRECTION

PATENT NO. : 5,209,763
DATED : May 11, 1993
INVENTOR(S) : Garrett E. Pack

It is certified that error appears in the above-indentified patent and that said Letters Patent is hereby corrected as shown below:

Column 3, line 60, "1" should be -- 13 --.

Signed and Sealed this

Twenty-first Day of December, 1993

Attest:

BRUCE LEHMAN

*Attesting Officer*      *Commissioner of Patents and Trademarks*